(12) United States Patent
Alderman

(10) Patent No.: US 6,307,350 B1
(45) Date of Patent: Oct. 23, 2001

(54) RECHARGEABLE DIRECT CURRENT POWER SOURCE

(75) Inventor: Robert J. Alderman, Canyon Lake, TX (US)

(73) Assignee: JA Effect, LLC, Wilmington, DE (US)

( * ) Notice: Subject to any disclaimer, the term of this patent is extended or adjusted under 35 U.S.C. 154(b) by 0 days.

(21) Appl. No.: 09/364,336

(22) Filed: Jul. 30, 1999

(51) Int. Cl.[7] .................................................. H01M 10/46
(52) U.S. Cl. ............................................................ 320/116
(58) Field of Search ................................... 320/116, 117, 320/118, 119, 120, 121

(56) References Cited

U.S. PATENT DOCUMENTS

| | | |
|---|---|---|
| 3,202,900 * | 8/1965 | McGivern, Jr. . |
| 3,820,004 | 6/1974 | Sugiura et al. . |
| 3,823,358 | 7/1974 | Rey . |
| 3,824,447 | 7/1974 | Kuwabara . |
| 4,139,812 * | 2/1979 | Huggins . |
| 4,321,661 | 3/1982 | Sano . |
| 4,636,930 | 1/1987 | Bingham et al. . |
| 4,670,702 | 6/1987 | Yamada et al. . |
| 4,839,574 | 6/1989 | Takabayashi . |
| 5,028,812 | 7/1991 | Bartky . |
| 5,095,223 | 3/1992 | Thomas . |
| 5,139,894 | 8/1992 | Mizuno et al. . |
| 5,397,931 | 3/1995 | Bayer . |
| 5,436,587 | 7/1995 | Cernea . |
| 5,461,557 | 10/1995 | Tamagawa . |
| 5,481,447 | 1/1996 | Caris et al. . |
| 5,491,623 | 2/1996 | Jansen . |
| 5,759,712 | 6/1998 | Hockaday . |
| 5,828,560 | 10/1998 | Alderman . |
| 6,100,665 | 8/2000 | Alderman . |

* cited by examiner

*Primary Examiner*—Edward H. Tso
(74) *Attorney, Agent, or Firm*—Thomas, Kayden, Horstemeyer & Risley

(57) ABSTRACT

A preferred embodiment of the renewable direct current power source of the present invention includes input terminals which are adapted to receive recharge voltage from a relatively low voltage power source and output terminals which are adapted to provide a battery-output voltage, with the battery-output voltage being higher than the recharge voltage. Preferably, a plurality of rechargeable battery cells are electrically interconnected between the input terminals and the output terminals and are configured to electrically interconnect with each other in series during discharge. A method aspect also is provided.

14 Claims, 10 Drawing Sheets

RECHARGEABLE DIRECT CURRENT POWER SOURCE

BACKGROUND OF THE INVENTION

1. Field of the Invention

The present invention relates to direct current (DC) power sources and, in particular, to rechargeable batteries that are configured to be recharged by recharging voltages that are lower than the output voltages of the batteries.

2. Description of the Related Art

Rechargeable batteries for providing renewable sources of direct current (DC) electric power are well known in the prior art. Heretofore, these prior art rechargeable batteries typically have been configured to be recharged by relatively high voltage power sources, e.g. power sources which possess higher voltage outputs than the batteries. Typically, such power sources include standard 110V household power which, through the use of an AC to DC converter, can provide suitable voltage for recharging the batteries. However, these power sources may not be available for use when recharging power is needed, i.e. during a power outage.

When relatively high voltage power sources are not available for recharging a battery, other sources of electrical power, such as relatively low voltage power sources, e.g. power sources which possess lower voltage outputs than the batteries to be charged, may be available. Heretofore, however, these power sources typically have not been utilized for providing recharging power to batteries. This is due, at least in part, to the configuration of the prior art batteries which typically are adapted to be recharged by relatively high voltage power sources. Specifically, these batteries typically require an input or recharging voltage, which is to be applied at the output terminals of the battery, that is higher than the output voltage of the battery.

Accordingly, there is a need to provide renewable DC power sources that overcome these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention generally is directed to rechargeable batteries which are configured to be recharged by relatively low voltage power sources. In accordance with an aspect of the invention, a preferred embodiment includes input terminals which are adapted to receive recharge voltage from a relatively low voltage power source and output terminals which are adapted to provide a battery-output voltage, with the battery-output voltage being higher than the recharge voltage. Preferably, a plurality of rechargeable battery cells are electrically interconnected between the input terminals and the output terminals and are configured to electrically interconnect with each other in series during discharge of the rechargeable battery.

In accordance with another aspect of the present invention, a preferred embodiment of the rechargeable battery incorporates a sequencer, which is electrically interconnected between the input terminals and the battery cells so that the recharge voltage provided at the input terminals is delivered to the sequencer. The sequencer then sequentially delivers voltage to each of the battery cells for charging the battery cells.

In accordance with another aspect of the present invention, a preferred embodiment of the rechargeable battery incorporates a voltage multiplier circuit which includes a circuit input, a circuit output and a plurality of charging capacitors interconnected between the circuit input and the circuit output. The voltage multiplier circuit alternately electrically interconnects the plurality of charging capacitors in parallel and in series so that recharge voltage is provided across the plurality of charging capacitors, intermittently added and provided as circuit-boosted voltage at the circuit output. In some embodiments, at least one such circuit is provided between the input and each of the battery cells. In other embodiments, one voltage multiplier may be adapted for providing circuit-boosted voltage to more than one battery cell, while in still other embodiments, a voltage multiplier circuit is not utilized.

Preferably, each voltage multiplier circuit includes at least one circuit stage, with each of the circuit stages incorporating a transistor interposed between first and second capacitors, and a plurality of diodes interconnected among the transistor and the capacitors. The diodes are configured to respond to recharge voltage applied to the circuit input so that when a voltage is present at the circuit input, the first and second capacitors are effectively connected in parallel across the circuit input. Additionally, the diodes are configured to respond to the recharge voltage applied to the circuit input so that when the voltage applied to the circuit input approaches zero, the first and second capacitors are effectively connected in series through the transistor, so that a voltage across each of the first and second capacitors is added and applied as circuit-boosted voltage at the circuit output for delivery to the battery cells.

In accordance with still another aspect of the present invention, a preferred embodiment of the rechargeable battery incorporates input terminals which are adapted to receive recharge power from a relatively low voltage power source during recharge, and output terminals which are adapted to apply battery-output voltage to an electronic device during discharge, with the battery-output voltage being higher than the recharge voltage. The rechargeable battery includes a plurality of rechargeable battery cell stages electrically interconnected between the input terminals and the output terminals, with each of the battery cell stages incorporating a battery cell interposed between first and second diodes.

In accordance with yet another aspect of the present invention, a preferred method for providing direct current electrical power includes the steps of: (1) providing a rechargeable battery that is adapted to provide an output voltage across its output terminals during discharge, and; (2) recharging the rechargeable battery utilizing only a recharge voltage which is lower than the output voltage. Preferably, the step of recharging the rechargeable battery includes the steps of: (1) providing the recharge voltage to the plurality of battery cells to recharge each of the plurality of battery cells, and; (2) configuring the plurality of battery cells in series so that charge provided to each of the battery cells during recharge is added and is then provided to the output terminals as the output voltage.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Figure 1A:
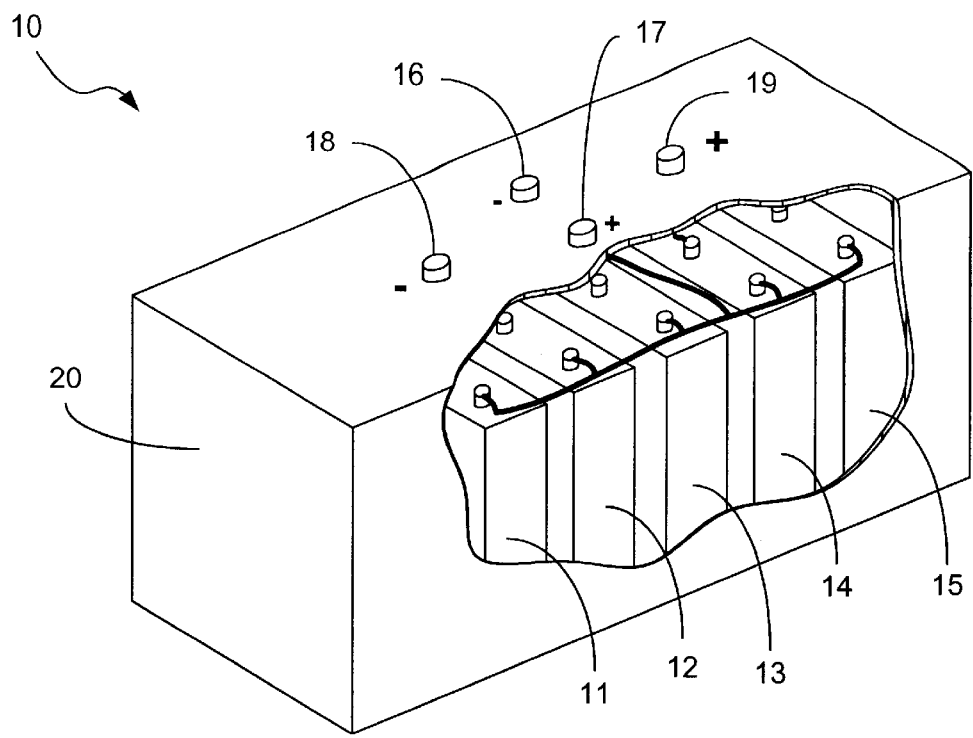
FIG. 1A is a partially cut-away, perspective view of a representative battery constructed in accordance with an aspect of the present invention.
Figure 1B:
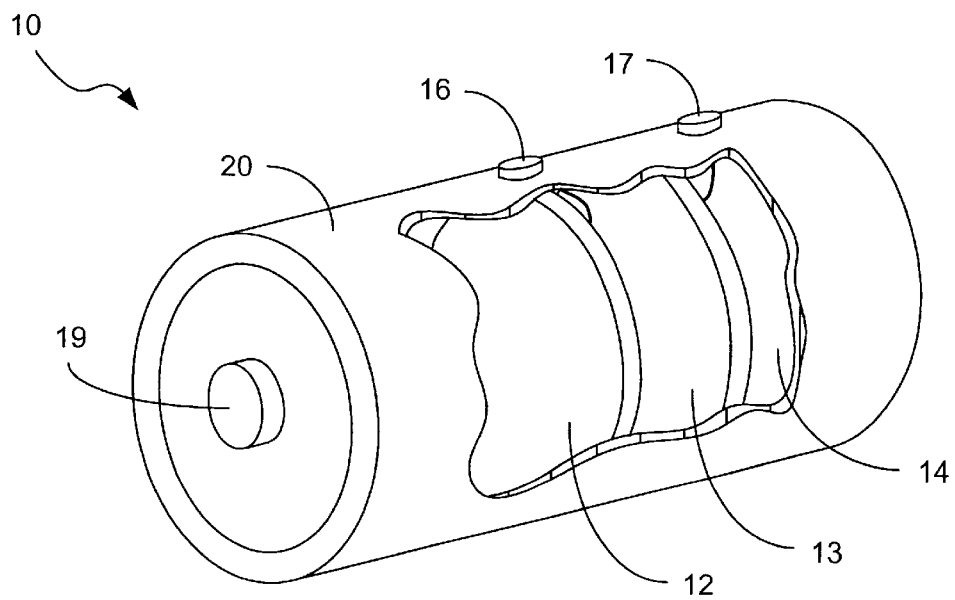
FIG. 1B is a partially cut-away, perspective view of a representative battery constructed in accordance with an aspect of the present invention.

Reference will now be made in detail to the description of the invention as illustrated in the drawings, wherein like reference numbers indicate like parts throughout the several views. As shown in FIGS. 1A and 1B, preferred embodiments of the rechargeable battery 10 of the present invention incorporate two or more battery cells, such as cells 11, 12, 13, 14 and 15, which are electrically interconnected between input terminals 16 and 17, and output terminals 18 and 19. The battery cells typically are encased in a housing 20, which can be formed in numerous shapes and sizes depending on the particular application. For instance, in the embodiment of FIG. 1A, battery 10 is sized and shaped to replace a typical lead-acid battery which is commonly used in automobiles, boats, etc, while in the embodiment of FIG. 1B, the battery is sized and shaped to replace a typical alkaline battery, such as is commonly used for powering portable electronic devices, i.e. radios, flashlights, etc.

The rechargeable battery 10 is utilized by applying the output or recharge voltage of a relatively low voltage power source (not shown), such as the output supplied from a fuel cell, low voltage battery, solar cell, etc., to the input terminals 16 and 17 (battery 10 also can be adapted, in some embodiments, to accommodate recharging by relatively high voltage power sources). The input terminals 16 and 17 provide the recharge voltage of the relatively low voltage power source across the battery cells for recharging the battery cells. In the various embodiments of the present invention, several charging methodologies are employed to charge the battery cells, including: charging each of the battery cells individually in a sequential manner until all of the battery cells of the battery have been charged, and; simultaneously charging at least some of the battery cells in parallel fashion. Regardless of the particular charging methodology employed, however, the voltage outputs of each of the battery cells are then provided in a series relationship, so that the charge accumulated across each battery cell forms a larger voltage or battery-output voltage which is placed across the output terminals 18 and 19, and is available as a source of DC power for powering electronic devices, for instance.

Figure 2:
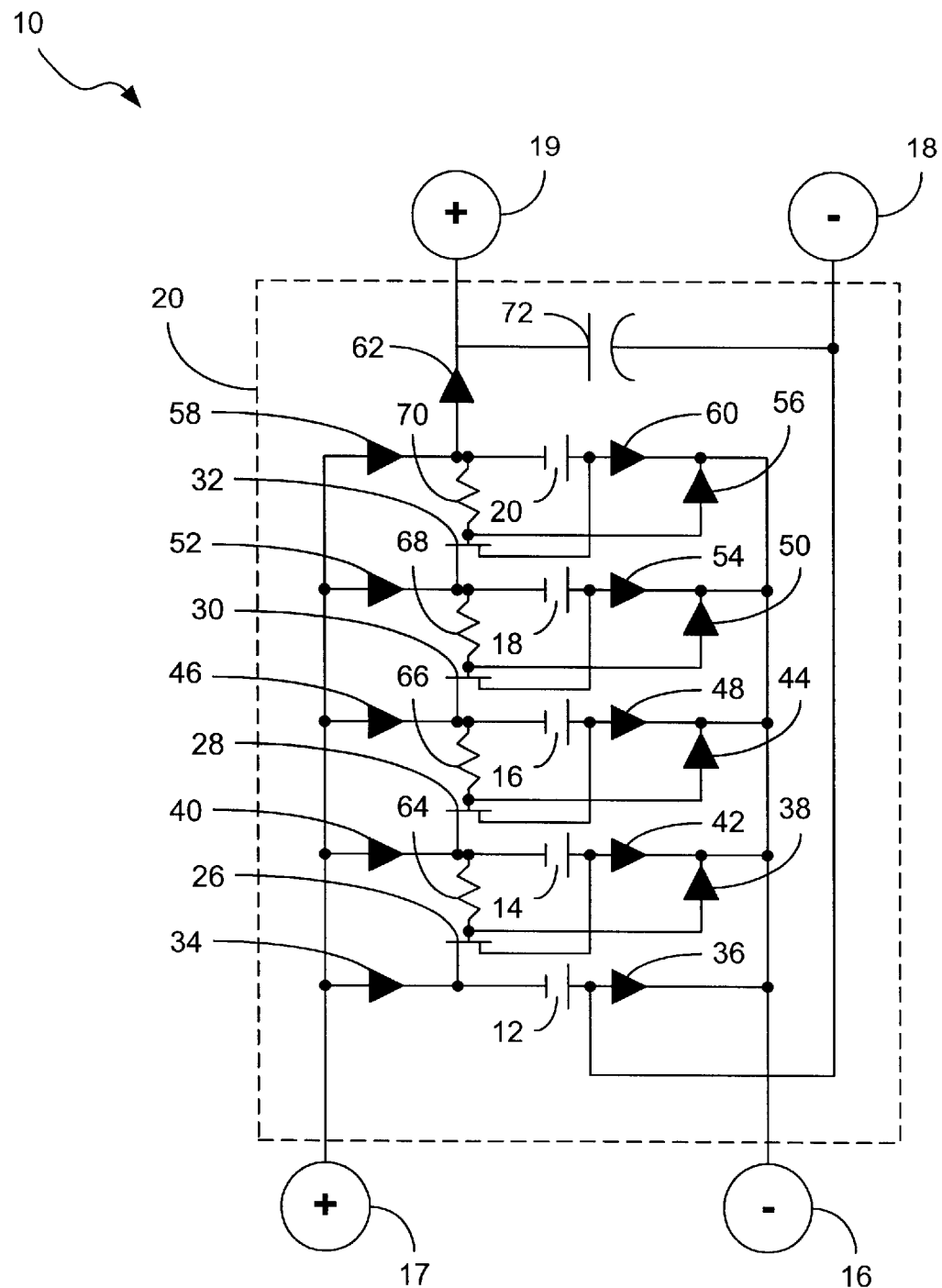
FIG. 2 is a schematic diagram illustrating a preferred embodiment of the present invention.

Referring now to FIG. 2, the component configuration of a preferred embodiment of battery 10 will be described in greater detail. As shown in FIG. 2, the battery cells 11, 12, 13, 14 and 15 are interconnected, in part, through transistors 26, 28, 30, and 32. Preferably, field effect transistors are utilized; however, bipolar transistors can be used for certain applications as well. Additionally, diodes 34, 36, 38, 40, 42, 44, 46, 48, 50, 52, 54, 56, 58, 60 and 62, and resistors 64, 66, 68 and 70 also are interconnected as shown. So configured, voltage applied across the input terminals 16 and 17 is applied across the battery cells in parallel fashion, and then the accumulated charges of the battery cells are provided across the output terminals 18 and 19 in a series fashion, thereby providing an output voltage which is larger than the input voltage that was utilized to charge the battery 10. As would be understood by one of ordinary skill in the art, the degree of amplification of the output voltage (battery-output voltage) over the input voltage (recharge voltage) is proportional to the number of battery cells that are provided in the battery.

The embodiment of FIG. 2 is particularly well suited for low power applications, such as cellular phones, laptops, toys, etc., because the voltage output of the battery 10 is inherently limited by the current rating of the incorporated transistors, e.g., transistors 26, 28, 30, and 32. Of particular interest, the charging technique associated with this embodiment has the potential of providing a relatively uniform charge to a multi-cell battery. For instance, when a typical multi-cell battery is charged in a prior art "series" fashion, the multi-cell battery typically will only charge to a charge level associated with the weakest cell of the multi-cell battery. However, by utilizing the charging technique embodied in battery 10, i.e. a technique where each cell of the multi-cell battery is independently charged, battery 10 may charge to a higher charge potential than was heretofore available by practicing the prior art.

The embodiment of FIG. 2 also is adapted to accumulate charge over time in a storage or tank capacitor 72 which can be provided across output terminals 18 and 19. This is particularly useful when a low recharge voltage is provided intermittently across the input terminals 16 and 17 (described in greater detail hereinafter). So configured, the charge stored in the tank capacitor 72 can be delivered to output terminals 18 and 19 when required.

Figure 3:
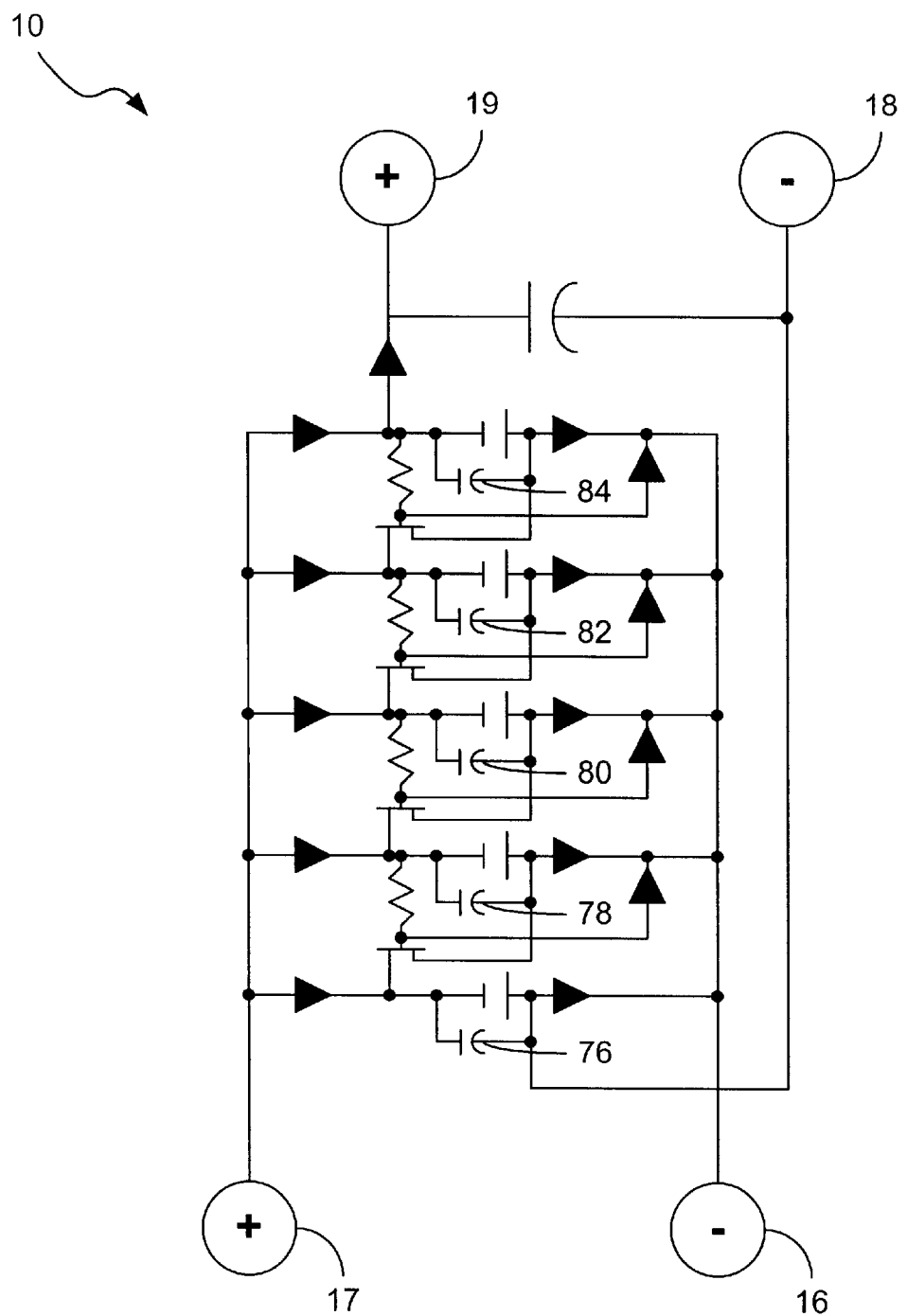
FIG. 3 is a schematic diagram illustrating an alternative embodiment of the present invention.

Referring now to FIG. 3, an alternative embodiment of battery 10 is provided which is constructed in a similar manner to the embodiment of FIG. 2; however, this embodiment incorporates a capacitor disposed across each of the aforementioned battery cells. Each capacitor (76, 78, 80, 82 and 84) is provided so that battery 10 can be efficiently charged within an alternating current source. Additionally, this configuration allows an individual battery cell, such as a cell with slower charging characteristics, to "catch up" with other cells during the charging process. This "catch-up" feature is facilitated by the aforementioned capacitors which store charge that the slower charging battery cell is unable to accumulate. Over time, the capacitor-accumulated charge is then applied to the slower charging cell, thereby increasing the charge potential of the slower charging cell.

Figure 4:
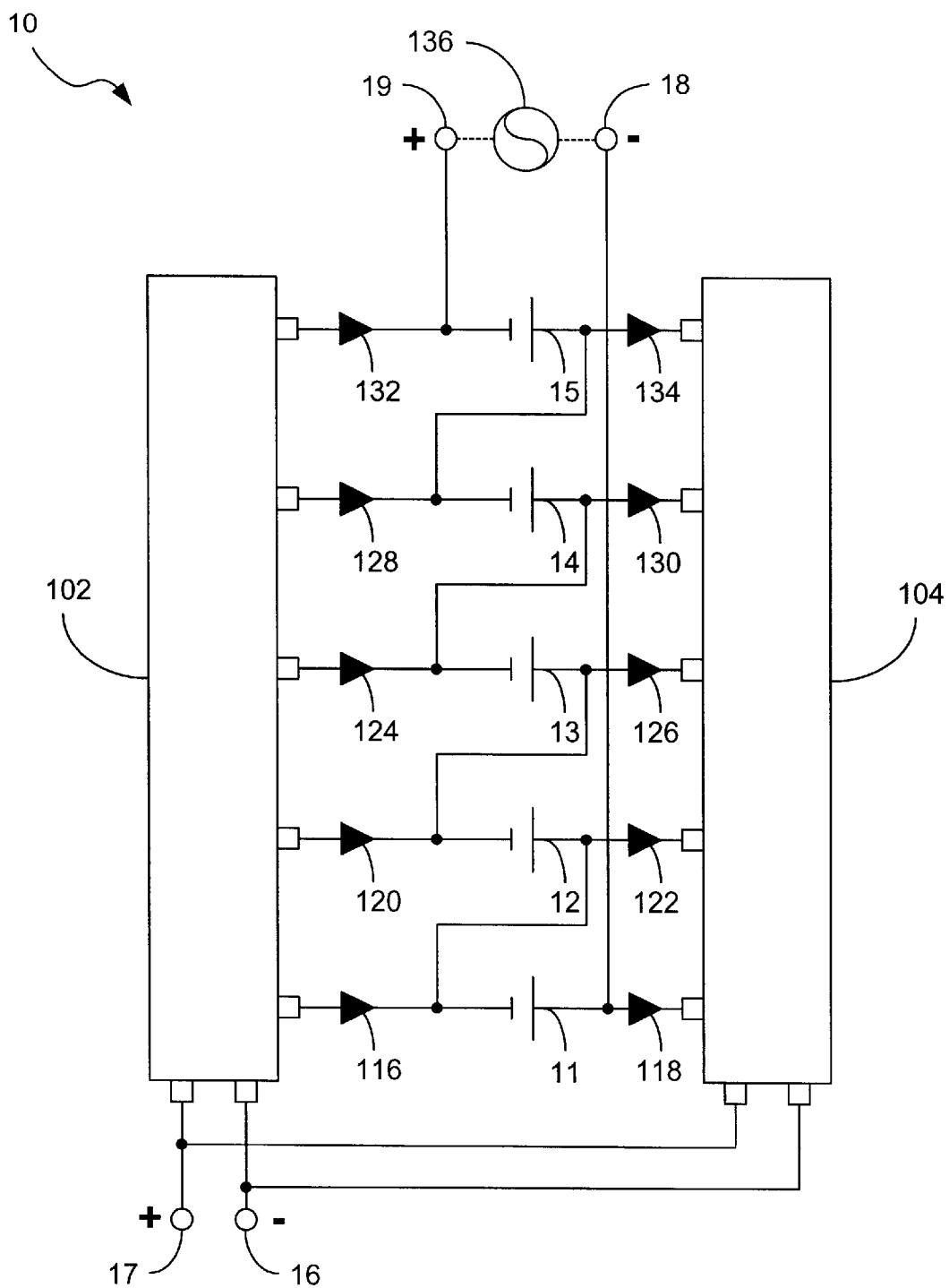
FIG. 4 is a schematic diagram illustrating an alternative embodiment of the present invention utilizing a sequencer.

As shown in FIG. 4, an alternative embodiment of the rechargeable battery 10 of the present invention is provided which incorporates two or more battery cells (11, 12, 13, 14 and 15) as well as sequencers 102 and 104. The sequencers cooperate with each other in a master-slave relationship so that the potential of a charging source received at the input terminals 16 and 17 is applied across battery cells in an individual or sequential manner. For instance, during each step of a charging sequence, the sequencers insure that only one of the battery cells is provided with charging potential, while the other battery cells are either electrically disconnected from the sequencers by means of switches or are provided with a reverse potential across their blocking diodes (blocking diodes 116, 118, 120, 122, 124, 126, 128, 130, 132 and 134 preferably being interconnected as shown in FIG. 4), so as to effectively produce an open circuit across the non-charging cells. So configured, each battery cell is able to recharge to a charge potential that corresponds to the input or recharge voltage, and then, after recharging, the charge potential of each battery cell is provided in series relationship with the other battery cells, thereby providing a larger battery-output voltage at the output terminals 18 and 19 of the battery 10 than was applied at the input terminals during recharge.

Sequencers 102 and 104 can be configured from numerous electrical components including decade counters, flip-flop chips, or individual electronic components, such as transistors, diodes, resistors, etc. Additionally, a mechanical variant of the embodiment depicted in FIG. 4 also can be constructed with mechanical relays versus the aforementioned electrical components. Furthermore, the embodiment of FIG. 4 has been found particularly well suited for charging individual battery cells while battery 10 is electrically connected at its output terminals 18 and 19 to a continuous load, e.g. load 136.

Figure 5:
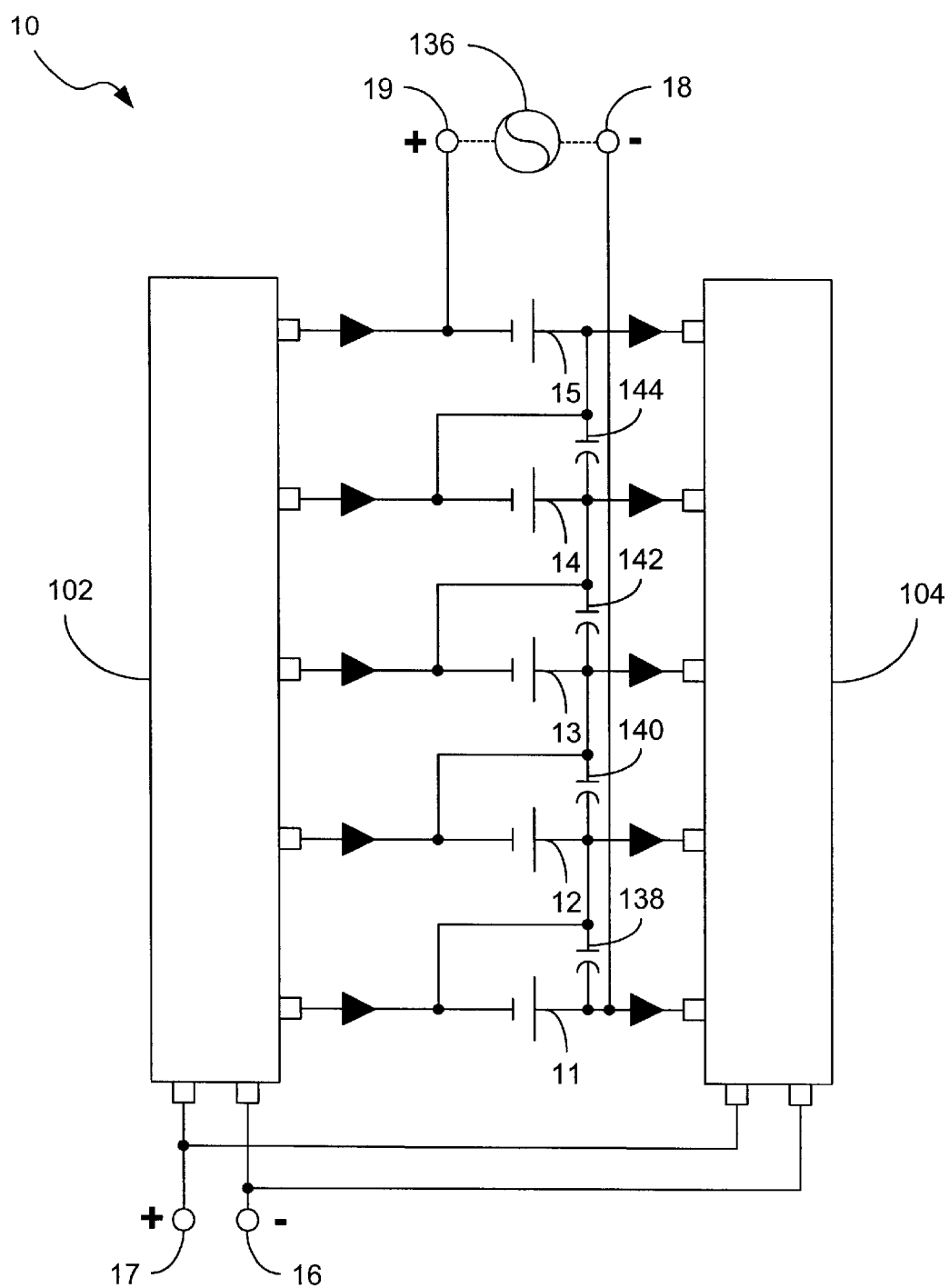
FIG. 5 is a schematic diagram illustrating an alternative embodiment of the present invention utilizing a sequencer.

Referring now to FIG. 5, an alternative embodiment of the battery 10 is provided which is constructed in a similar manner to that depicted in FIG. 4. This embodiment, however, incorporates a capacitor disposed across each of the battery cells, e.g. capacitors 138, 140, 142 and 144. These capacitors assist in the charging process by storing and then applying charging potential to the individual battery cells when the recharging voltage is removed from an individual battery cell during the charging sequence. The capacitors also act to filter out any noise generated when the sequencers selectively apply and remove power from the battery cells during the charging sequence. The charge capacity of each of the capacitors also can be configured relative to the speed of the charging sequence. For instance, as sequencing speed is increased, the charge capacity of each capacitor can be decreased, thereby resulting in a shorter charging duration for the capacitors. Additionally, a tank capacitor 72 can be provided across output terminals 18 and 19, as described hereinbefore. So configured, the charge stored in tank capacitor 72 can be delivered to output terminals 18 and 19, when needed.

As mentioned hereinbefore, charging of the battery cells of the present invention can be provided by intermittently applying a recharge voltage across the input terminals 16 and 17 of the battery 10. This intermittent recharge voltage may be provided in numerous situations, such as when recharge voltage is received from a low voltage power source, for instance, with the input being selectively provided to each battery cell when an interruption of recharge voltage being sensed by an individual battery cell as the recharge voltage is switched between the various battery cells. As will be described in more detail hereinafter, the operation of a preferred embodiment of a voltage multiplier circuit 200 (such as shown in FIG. 6), which can be incorporated into the battery 10 of the present invention, performs in response to such an intermittent or oscillatory input signal.

Preferably, in embodiments incorporating the aforementioned multiplier circuit, the recharge voltage being applied to a battery cell oscillates between a near zero voltage value and some positive voltage value. However, it will be appreciated by those skilled in the art that similar operation could be achieved with a pure oscillatory input signal. Indeed, even for purposes of the preferred embodiment, a pure oscillatory input signal (i.e., both positive and negative going values) could be converted simply by inserting a diode into the input of the multiplier circuit to clip the negative going voltage value, and thus achieve an input signal oscillating between some positive voltage value and a near zero voltage value. Indeed, as previously mentioned, depending upon the needs of a particular application, the oscillating or time-varying aspect of the input signal may include an oscillatory voltage that oscillates between a positive and negative going voltage, or a voltage that oscillates between some positive or negative value and a near zero value. Alternatively, the time-varying aspect may simply mean a voltage that varies on a one time basis, whether that variance is between some positive and negative value, or between some value and a near zero value.

Figure 6:
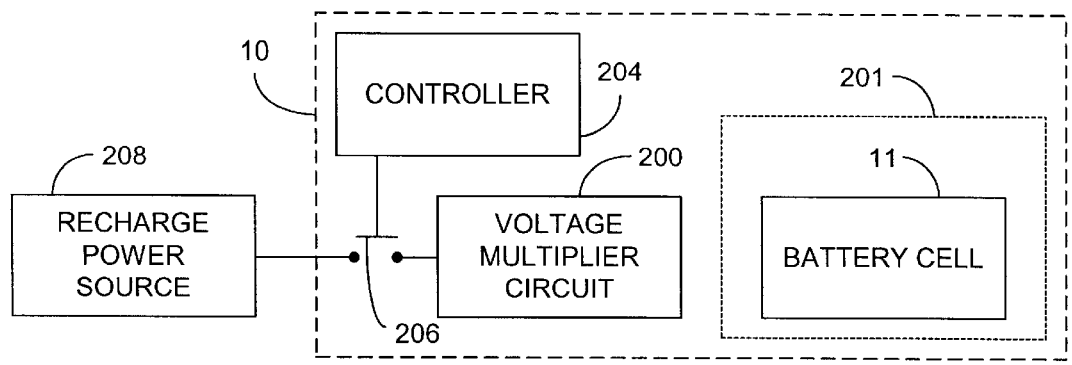
FIG. 6 is a top-level block diagram of an alternative embodiment of the present invention incorporating a voltage multiplier circuit.

FIG. 6 depicts a representative portion of a battery 10 (such as shown in the embodiments of FIGS. 1–5, among others), which includes a battery stage 201. Battery stage 201 includes a battery cell, such as battery cell 11, for instance, and its associated components, such as the various diodes which allow the battery cell to charge and discharge as described hereinbefore. The battery stage also cooperates with a controller 204, i.e. a sequencer, that operates a switch 206 which is illustrated in FIG. 6 as a normally-open, momentarily-closed one-way switch. The output of a recharge power source 208, for instance, is applied to the input terminals of the battery 10 and then is delivered to the input 210 of the voltage multiplier circuit 200 when the switch 206 is closed; and is removed from the input 210 of the voltage multiplier when the switch 206 is opened. The controller 204 operates to open and close the switch 206 so as to remove and apply the voltage of the recharge power source, thereby applying recharge voltage to the input of the voltage multiplier circuit 200 in an intermittent manner. Battery 10 can incorporate the voltage multiplier circuit 200 in numerous configurations which are well within the scope of the present invention, including: providing each battery with a circuit 200, with each circuit being electrically interconnected between the input terminals 16 and 17 and its respective battery cell; providing each battery cell stage 201 with a circuit 200; and, providing each battery 10 with a circuit 200, with the circuit 200 being adapted to electrically communicate with each the battery cells as required, among others.

Figure 7:
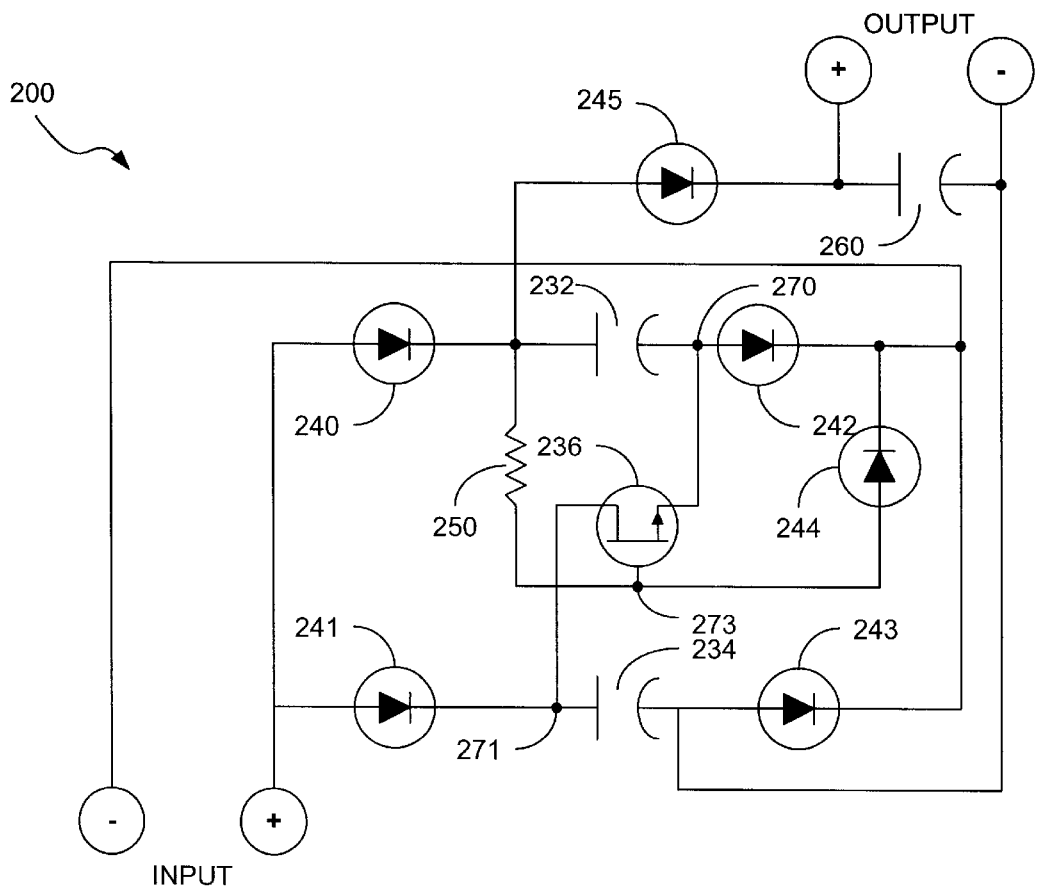
FIG. 7 is a schematic diagram illustrating a single stage of a voltage multiplier circuit constructed in accordance with one aspect of the present invention.

Turning now to FIGS. 7–11, reference is made to several embodiments of the voltage multiplier circuit 200 constructed in accordance with the present invention. As will be further described below, the voltage multiplier circuit 200 can include a plurality of identically constructed sections or circuit stages. For simplicity of description, FIG. 7 illustrates a single circuit stage, and for that reason, will be first described in order to facilitate the understanding of the multi-stage implementation of several other embodiments of the circuit 200.

FIG. 7 illustrates an embodiment of the voltage multiplier circuit 200 having two charging capacitors 232 and 234 interconnected, in part, through a transistor 236. In the preferred embodiment, a field effect transistor is utilized; however, a bipolar transistor can be used for certain applications and embodiments as well. Diodes 240, 241, 242, 243, 244, 245, and resistor 250 also are interconnected as illustrated in FIG. 7. Optionally, a storage or tank capacitor 260 can be provided across the output terminals for storing and accumulating a larger amount of power. In a manner that is known by those skilled in the art, by switching the operation of the voltage multiplier circuit 200 to intermittently provide voltage across the output terminals, over time, charge may be accumulated and stored in the tank capacitor 260. Then, when needed, the stored charge can be delivered to its associated battery cell as circuit-boosted voltage for recharging the battery cell. Each battery cell, such as battery cell 11, for instance, is then capable of providing its charge to the battery 10, as described hereinbefore.

The voltage multiplier circuit 200 operates by applying the relatively low voltage input supplied from recharge power source 208 across a plurality of capacitors (232 and 234), to charge those capacitors in parallel fashion. Then, once those capacitors have reached a charge of sufficient level, they are switched into a series relationship so that voltage accumulated across each charging capacitor is added to form a larger voltage value, which then is placed across the output of the circuit 200 as circuit-boosted voltage. This larger voltage is then delivered to a battery cell, as required, in order to recharge the battery cell. Therefore, as would be understood by one of ordinary skill in the art, the amplification of the multiplier circuit 200 is proportional to the number of charging capacitors that are disposed in parallel relation.

Figure 8B:
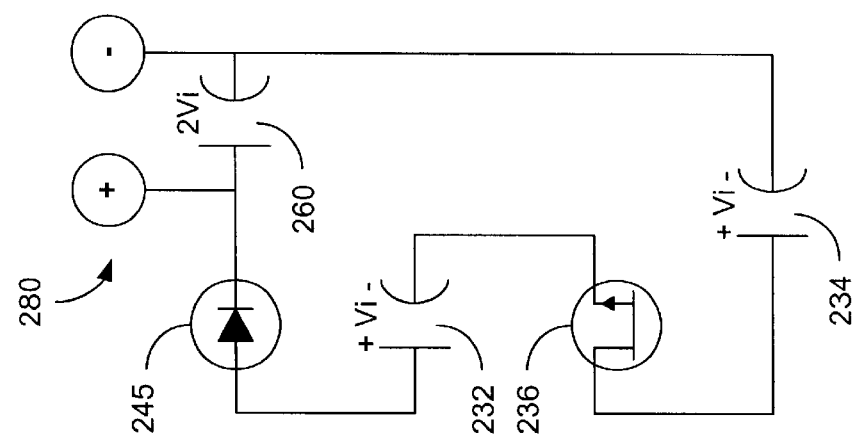
FIG. 8B illustrates the effective or operative circuit of the circuit illustrated in FIG. 7, when the voltage applied to the input of the circuit is changed to a near zero value.
Figure 8A:
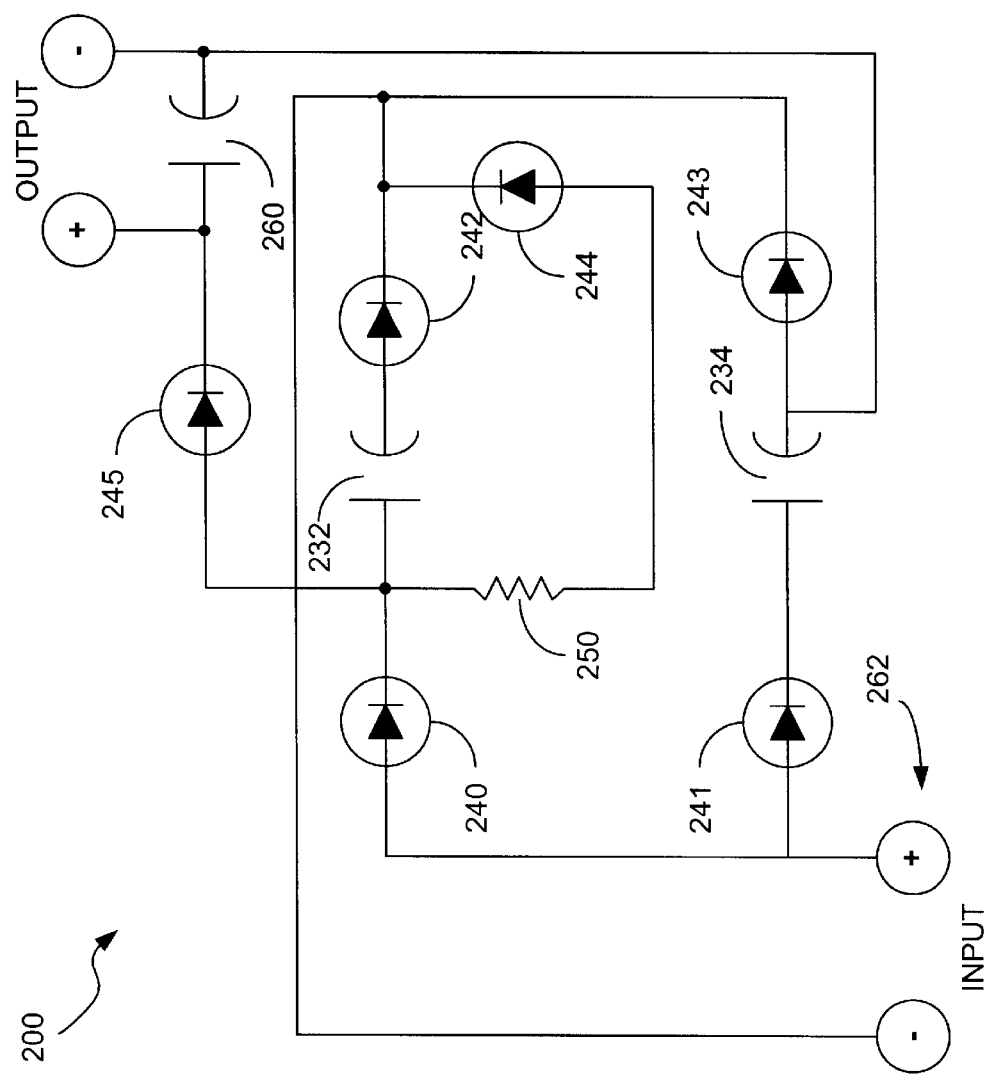
FIG. 8A illustrates the effective or operative circuit of the circuit illustrated in FIG. 7, when a voltage is applied to the input of the circuit.

Reference is now made to FIGS. 8A and 8B to more particularly describe the operation of the circuit 200 illustrated in FIG. 7. As previously described, the voltage provided by recharge power source 208 is applied to the input 262 in a time-varying or oscillatory fashion. Preferably, the voltage applied to input 262 will vary between some positive value, as indicated by the polarity of the input terminals 262, and some value near zero value, such as by operation of the controller 204 and switch 206 of the battery 10 (FIG. 8A illustrates the effective, or operative, circuit components when a positive voltage value is applied to the input 262, and FIG. 8B illustrates the effective or operative circuit components when the voltage is removed from the input). As shown in FIG. 8A, as a positive value input voltage is applied at 262, the transistor 236 is effectively removed from the circuit 200. This is because diode 244 prevents the transistor 236 from turning on. Stated another way, the voltage drop across diode 244 is equal to that across diode 242. Therefore, the potential or voltage at the gate 273 of the transistor is the same as the potential at the drain 270 (see FIG. 7) of the transistor 236 and, therefore, the transistor 236 cannot turn on. When, however, the charging capacitors 232 and 234 have charged to a sufficient level and the voltage is removed from the input 262, then the circuit of FIG. 7 effectively becomes that illustrated in FIG. 8B (for purposes of this discussion, it will be assumed that the capacitors 232 and 234 sufficiently charge to a level Vi).

Upon removal of the input voltage, the charge of capacitor 232 causes the transistor 236 to turn on. Diodes 242 and 244 become reverse biased and effectively drop from the circuit, and the capacitors 232 and 234 become series connected through the source and drain of transistor 236. Ignoring the voltage drop across the transistor 236, and the voltage drop across diode 245, the value of the voltages stored in capacitors 232 and 234 will be added and applied to the output 280. Thus, the voltage at the output will be approximately 2Vi. As previously described in connection with FIG. 7, a tank capacitor 260 can be applied across the output so that the voltage 2Vi operates to charge this tank capacitor 260.

Figure 9:
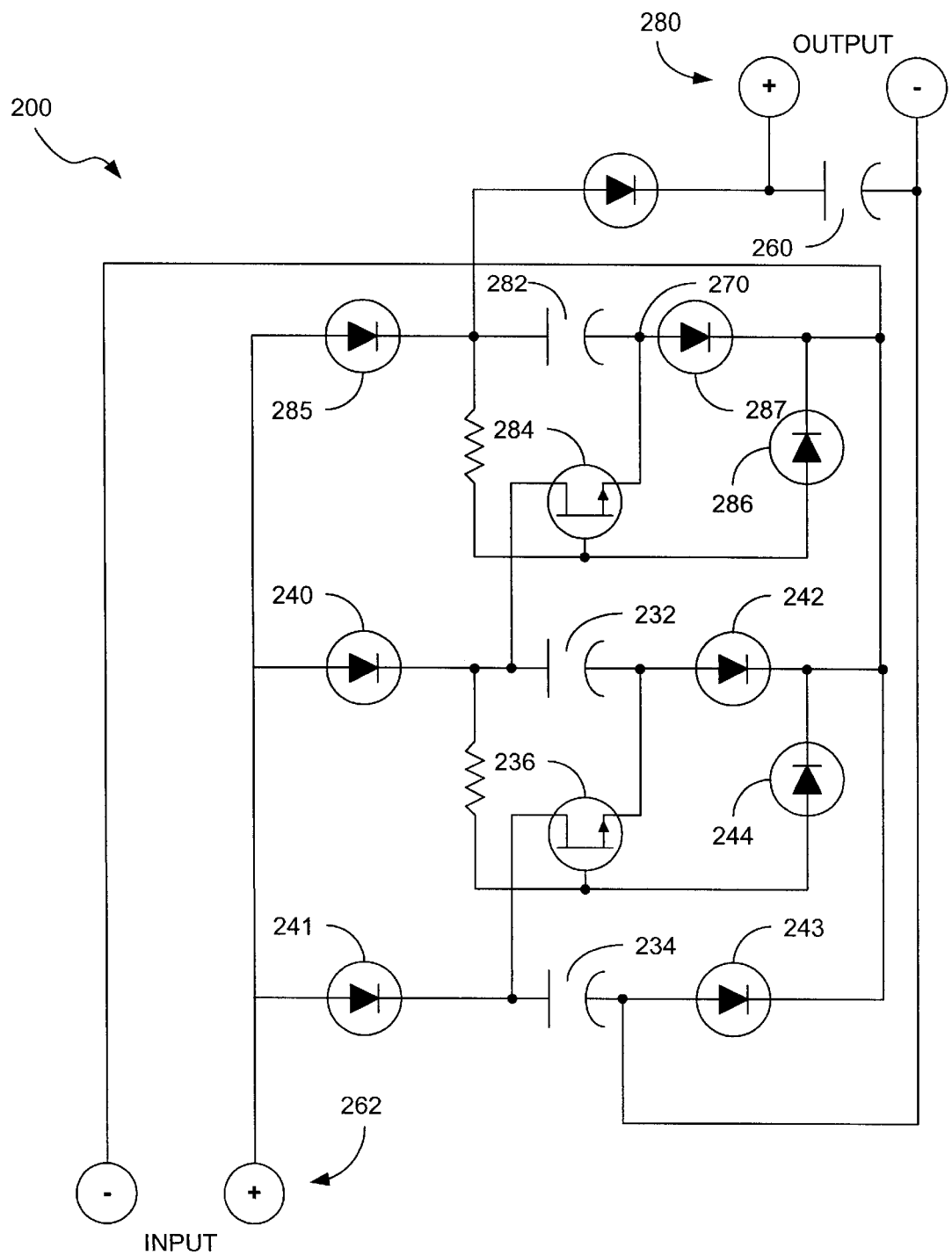
FIG. 9 is a schematic diagram similar to that of FIG. 7, but illustrating a multiple staged circuit.

Reference is now made to FIG. 9 which shows a similar, but expanded circuit embodiment of the voltage multiplier circuit 200. An additional capacitor 282 is added so that there are three capacitors (282, 232, and 234) operating within the circuit in this embodiment. The operation of the lower part of the circuit (that part including capacitors 232 and 234, and transistor 236, along with the surrounding diodes 240, 241, 242, 243 and 244) operates in a fashion similar to that described in connection with the circuit of FIGS. 7, 8A, and 8B. An additional stage, however, is added to this circuit which includes capacitor 282, transistor 284, and diodes 285, 286 and 287. Without presenting a detailed description, like that presented in connection with FIG. 7, it will be understood by one skilled in the art that the overall circuit of FIG. 9 operates much like that described in connection with FIG. 7. Specifically, when a voltage is applied to the input 262, that same voltage (ignoring the voltage drop across the diodes) is applied across capacitors 282, 232, and 234. In this way, these three capacitors are effectively connected and parallel. Then, when the voltage source is removed from the input terminals 262, and in the manner described in connection with FIG. 8B, the capacitors 282, 232, and 234 become effectively connected in series through transistors 284 and 236. The sum of the three individual voltages across each of the capacitors then is applied to the output 280 and provided to a battery cell, such as battery cell 11 (FIG. 6).

Figure 10:
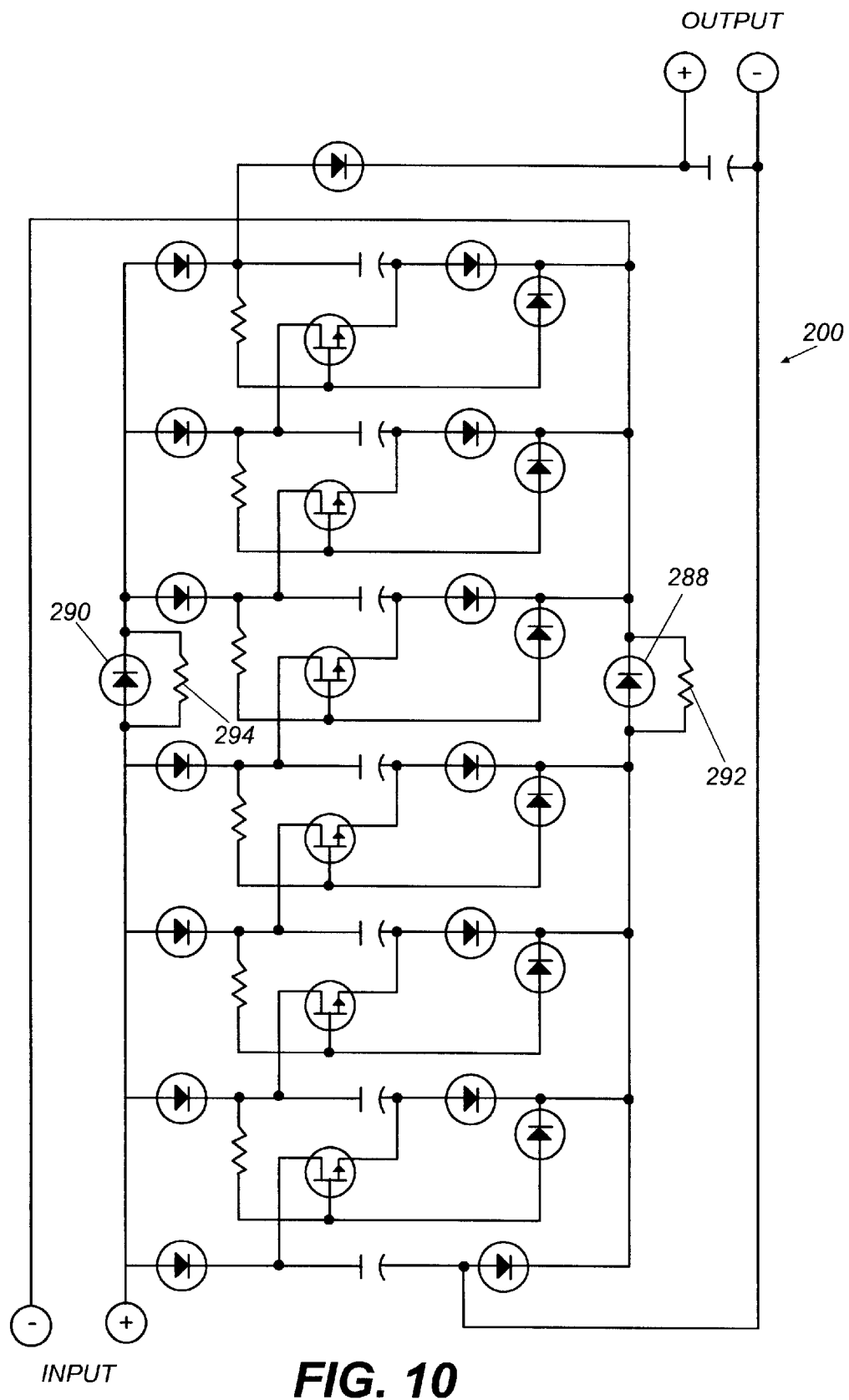
FIG. 10 is a schematic diagram illustrating a multi-staged converter circuit constructed in accordance with an aspect of the present invention.

As shown in FIG. 10, an alternative embodiment of multiplier circuit 200 is provided that is similar to the embodiments described in FIGS. 7 and 9, except that the embodiment of FIG. 10 incorporates even a greater number of multiplier stages. In addition, this embodiment illustrates the use of diodes 288 and 290. Functionally, these diodes (288, 290) do not effect the broad functional operation of the circuit; however, in practice, it is preferred to provide high voltage diodes 288 and 290 in connection with large resistors 292 and 294 (e.g., 10 mega-ohm) to help spread the leakage current realized by the other diodes of the circuit. This feature becomes particularly important as the number of stages for the multiplier circuit 200 is increased. Although FIG. 10 is illustrated with one diode/resistor pair on each side of the circuit, multiple diode resistor pairs could be similarly disposed along each side.

One advantage of the multiplier circuits 200 of the present invention is that the components can be entirely implemented in a solid state integrated circuit, and therefore, manufactured at a relatively low cost. Furthermore, by operating exclusively electronically, the multiplier circuits described hereinabove operate much more efficiently than do those of the type utilizing a step-up transformer. As will be further appreciated, the component values of resistor 292 and 294 will be selected based upon the charging capacitors utilized in the multiplier circuit. Specifically, component values will be chosen to allow the charging capacitors to sufficiently charge.

Figure 11:
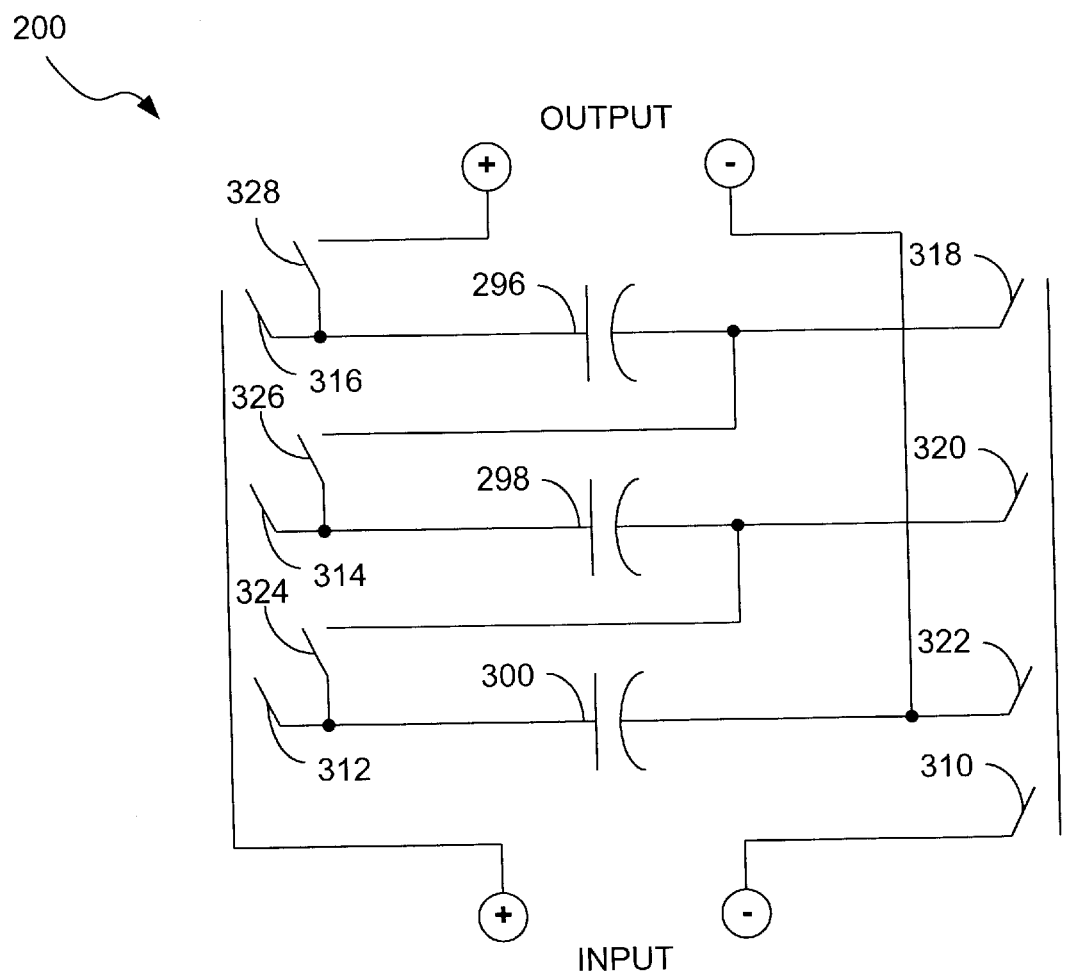
FIG. 11 is a schematic diagram illustrating an alternative embodiment of the voltage conversion circuit.

FIG. 11 illustrates an alternative embodiment of the voltage multiplier circuit 200 having three capacitors 296, 298 and 300, which are interconnected with conventional mechanical switches (310, 312, 314, 316, 318, 320, 322, 324, 326 and 328), such as reed relays, among others, vice the aforementioned diodes and transistors. A power source, such as recharge power source 208 (FIG. 6), provides charging voltage to the capacitors 296, 298 and 300, with the switches arranged in a parallel-capacitor configuration (e.g. 310, 312, 314, 316, 318, 320, and 322 on, and 324, 326 and 328 off). When the capacitors have sufficiently charged, the switch positions are reversed, thereby connecting the capacitors in series-capacitor configuration to provide their voltage to the output of the circuit. This amplified or circuit-boosted voltage is then provided to the battery 10 for charging, as described hereinbefore. The contact points of the switches also can incorporate gold plating to improve the efficiency of the circuit.

It should also be noted that efficiency of the mechanical embodiment of the multiplier circuit 200 (such as shown in FIG. 11) can be greater than that of the aforementioned electronic embodiments, particularly when being recharged by relative low voltage output power sources, such as a low voltage output fuel cell, among others, because the mechanical switches do not include the voltage drops associated with the diodes and transistors of the electronic embodiments. This allows a single relatively low voltage output fuel cell, for example, to charge a battery having a higher output voltage than the output of the fuel cell since the fuel cell voltage output does not need to overcome the voltage drops associated with the aforementioned diodes and transistors in order to enable the multiplier circuit.

In some embodiments (not shown), the multiplier circuit 200 can incorporate a storage or tank capacitor disposed across its input. So configured, the circuit can be controlled to repeatedly oscillate its switches between the parallel-capacitor configuration and the series-capacitor configuration, so as to allow the tank capacitor to charge when the switches are in the series-capacitor configuration (e.g. discharging to output), and to allow the tank capacitor to discharge to the battery cells when the switches are in the parallel-capacitor configuration (e.g. charging). Additionally, oscillation of the switches can be accomplished by a device, such as a multi-vibrator, among others, which normally biases the switches to the parallel-capacitor configuration, and which positions the switches to the series-capacitor configuration, such as when demand for recharge power from the battery is sensed. For embodiments of the circuit incorporating the multi-vibrator, the switches also can be ganged so that only one multi-vibrator is required to simultaneously position all of the switches.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A rechargeable battery comprising:

input terminals adapted and arranged to receive a recharge voltage;

output terminals adapted and arranged to provide battery-output voltage across said output terminals, said battery-output voltage being higher than the recharge voltage; and a plurality of rechargeable battery cells electrically interconnected between said input terminals and said output terminals, said plurality of rechargeable battery cells being configured to electrically interconnect with each other in series during discharge of said rechargeable battery such that said plurality of rechargeable battery cells provide said battery-output voltage to said output terminals;

wherein said rechargeable battery has a sequencer electrically interconnected between said input terminals and said battery cells such that the recharge voltage provided at said input terminals is delivered to said sequencer and then sequentially delivered to each of said battery cells.

2. The rechargeable battery of claim 1, wherein said rechargeable battery has a diode interconnected between said input terminals and each of said battery cells, each of said diodes having an associated voltage drop, such that said plurality of battery cells are configured to electrically interconnect in series when the recharge voltage applied at said input terminals is lower than said voltage drop.

3. The rechargeable battery of claim 1, wherein said rechargeable battery has a voltage multiplier circuit interconnected between said input and each of said battery cells, each of said voltage multiplier circuits having a circuit input, a circuit output and a plurality of charging capacitors interconnected between said circuit input and said circuit output, each of said voltage multiplier circuits configured to alternately electrically interconnect said plurality of charging capacitors in parallel and in series such that recharge voltage is provided across said plurality of charging capacitors, intermittently added and provided as said circuit-boosted voltage at said circuit output, said circuit-boosted voltage then being applied to one of said battery cells.

4. The rechargeable battery of claim 3, wherein said voltage multiplier circuit has mechanical switches, such that said mechanical switches cooperate to selectively configure said plurality of charging capacitors in parallel and in series.

5. The rechargeable battery of claim 3, wherein said voltage multiplier circuit has means for selectively configuring said plurality of charging capacitors in parallel and in series.

6. A rechargeable battery comprising:

input terminals adapted and arranged to receive a recharge voltage;

output terminals adapted and arranged to provide battery-output voltage across said output terminals, said battery-output voltage being higher than the recharge voltage; and a plurality of rechargeable battery cells electrically interconnected between said input terminals and said output terminals, said plurality of rechargeable battery cells being configured to electrically interconnect with each other in series during discharge of said rechargeable battery such that said plurality of rechargeable battery cells provide said battery-output voltage to said output terminals;

wherein said rechargeable battery has a voltage multiplier circuit interconnected between said input and said battery cells, said voltage multiplier circuit having a circuit input, a circuit output and a plurality of charging capacitors interconnected between said circuit input and said circuit output, said voltage multiplier circuit configured to alternately electrically interconnect said plurality of charging capacitors in parallel and in series such that recharge voltage is provided across said plurality of charging capacitors, intermittently added and provided as said circuit-boosted voltage at said circuit output, said circuit-boosted voltage then being applied to said battery cells; and wherein said rechargeable battery has a sequencer electrically interconnected between said voltage multiplier circuit and said battery cells such that said circuit-boosted voltage provided at said circuit output is delivered to said sequencer and then sequentially delivered to each of said battery cells.

7. The rechargeable battery of claim 6, wherein said voltage multiplier circuit has mechanical switches, such that said mechanical switches cooperate to selectively configure said plurality of charging capacitors in parallel and in series.

8. The rechargeable battery of claim 6, wherein said voltage multiplier circuit has means for selectively configuring said plurality of charging capacitors in parallel and in series.

9. The rechargeable battery of claim 6, wherein said rechargeable battery has a diode interconnected between said input terminals and each of said battery cells, each of said diodes having an associated voltage drop, such that said plurality of battery cells are configured to electrically interconnect in series when the recharge voltage applied at said input terminals is lower than said voltage drop.

10. A rechargeable battery adapted for being recharged by a relatively low voltage power source and for powering an electronic device, the relatively low voltage power source providing a recharge voltage, said rechargeable battery comprising:

input terminals adapted and arranged to receive recharge power from a relatively low voltage power source during recharge of said rechargeable battery;

output terminals adapted and arranged to apply battery-boosted voltage to an electronic device during discharge of said rechargeable battery, said battery-boosted voltage being higher than the recharge voltage;

a plurality of rechargeable battery cell stages electrically interconnected between said input terminals and said output terminals, each of said battery cell stages comprising a battery cell and first and second diodes, said battery cell being interposed between said first and second diodes, said battery cell stages configured to electrically interconnect with each other in parallel such that the recharge voltage applied at said input terminals during recharge is provided across each of said battery cells, then said battery cell stages interconnect with each other in series such that the recharge power is added, and provided as battery-output voltage at said output terminals during discharge;

wherein a voltage multiplier circuit is interconnected between said input terminals and said battery cell stages, said voltage multiplier circuit having a circuit input, a circuit output and a plurality of charging capacitors interconnected between said circuit input and said circuit output, said voltage multiplier circuit configured to electrically interconnect said plurality of charging capacitors in parallel when the recharge voltage is present at said circuit input, and further configured to electrically interconnect said plurality of charging capacitors in series when the recharge voltage at said circuit input approaches zero, such that the recharge voltage across said plurality of charging capacitors is added and provided as circuit-boosted voltage at said circuit output for delivery to said battery cell stages; and wherein said voltage multiplier circuit has at least one circuit stage, each of said circuit stages comprising:

a first and second capacitor;

a transistor interposed between said first and second capacitors; and a plurality of diodes interconnected among said transistor and said first and second capacitors, said plurality of diodes being configured to respond to the recharge voltage applied to said circuit input so that when a voltage is present at said circuit input said first and second capacitors are effectively connected in parallel across said circuit input, said plurality of diodes being further configured to respond to the recharge voltage applied to said circuit input so that when the voltage applied to said circuit input approaches zero, said first and second capacitors are effectively connected in series through said transistor, so that a voltage across each of said first and second capacitors is added and applied as circuit-boosted voltage at said circuit output for delivery to said battery cell stages.

11. The rechargeable battery of claim 10, wherein said voltage multiplier circuit has means for selectively configuring said plurality of charging capacitors in parallel and in series.

12. The rechargeable battery of claim 10, wherein said voltage multiplier circuit has mechanical switches, such that said mechanical switches cooperate to selectively configure said plurality of charging capacitors in parallel and in series.

13. A method for providing direct current electrical power comprising the steps of:

providing a rechargeable battery having input terminals and output terminals, said rechargeable battery being adapted to provide an output voltage across said output terminals during discharge, said rechargeable battery having a plurality of battery cells and;

recharging said rechargeable battery utilizing only a recharge voltage by configuring said plurality of battery cells in parallel and sequentially applying said recharge voltage to each of said plurality of battery cells; and configuring said plurality of battery cells in series such that charge provided to each of said battery cells during recharge is added and is then provided to said output terminals as said output voltage.

14. The method of claim 13, wherein the step of sequentially applying said recharge voltage to each of said plurality of battery cells comprises the steps of:

providing a sequencer electrically interconnected between said input terminals and said battery cells such that the recharge voltage provided at said input terminals is delivered to said sequencer; and sequentially applying said recharge voltage from said sequencer to each of said plurality of battery cells.

* * * * *